Oct. 16, 1934.  H. L. JOHNSTON  1,977,067
SLICING MACHINE

Original Filed Jan. 23, 1930   2 Sheets-Sheet 1

INVENTOR
Herbert L. Johnston
BY Maréchal & Noe
ATTORNEY

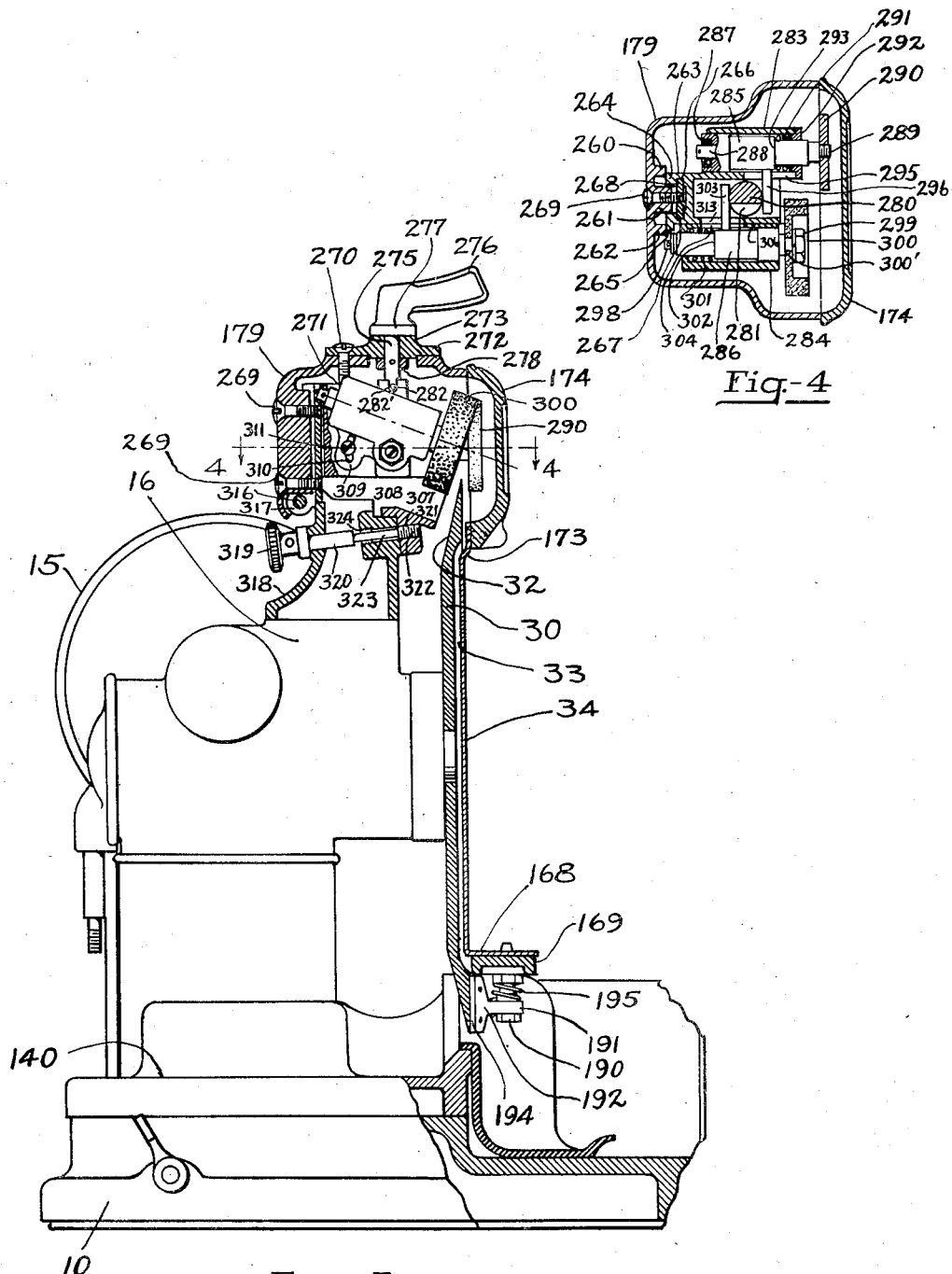

Patented Oct. 16, 1934

1,977,067

UNITED STATES PATENT OFFICE 1,977,067

SLICING MACHINE

Herbert L. Johnston, Troy, Ohio, assignor to The Hobart Manufacturing Company, Troy, Ohio, a corporation of Ohio Original application January 23, 1930, Serial No. 422,746. Divided and this application May 27, 1931, Serial No. 540,280

15 Claims. (Cl. 146—102)

This invention relates to food handing apparatus, and more particularly to slicing machines.

One of the principal objects of this invention is to provide apparatus of this character having highly effective sharpening mechanism which is normally positioned in operative relationship adjacent the cutting edge of the rotary knife with the grinders or sharpeners out of contact with the knife but ready for instantaneous sharpening use without adjustment or resetting of the entire grinder mechanism and which is also adapted to be readily removed from operative position to expose the grinder parts for cleaning.

Another object of the invention is to provide a slicing machine of this character having sharpening mechanism arranged in a simple and economical manner to assist in the effective guarding of the knife edge to thereby protect the operator, while at the same time having the sharpening mechanism in operative position adjacent the knife edge ready for instantaneous sharpening use.

Another object of the invention is to provide a slicing machine of this character with a grinder attachment arranged to cooperate with and support protective guards and plates associated with the knife, while providing ready removability of these parts.

Still another object of the invention is to provide a compact, highly effective, simple and economical grinder attachment for the rotary knife, in which the operative parts of the attachment are enclosed and protected, while at the same time these parts are mounted for easy and instantaneous sharpening operation as well as their desired adjustment to compensate for the wear of the knife or other reasons.

Other objects and advantages of the invention will be apparent from the following description, the accompanying drawings and the appended claims.

This is a division of my copending application Serial No. 422,746, filed January 23, 1930, for Food handling apparatus.

In the drawings, in which like characters of reference are used to denote like parts throughout the several views thereof—

Fig. 3 is a partial vertical sectional view taken on the plane of the line 3—3 of Fig. 1; and Fig. 4 is a horizontal sectional view taken on the plane of the line 4—4 of Fig. 3, the section being taken so as to pass through the longitudinal axes of each grinder sleeve.

Figure 1:
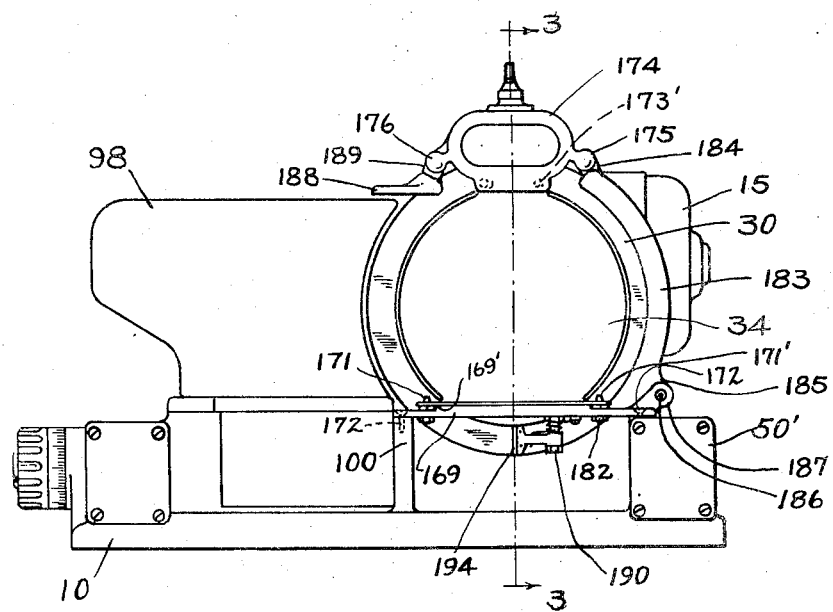
Fig. 1 is a side elevational view of apparatus constructed in accordance with this invention, the view being taken from the front side of the machine with the meat supporting carriage and related mechanism removed.
Figure 2:
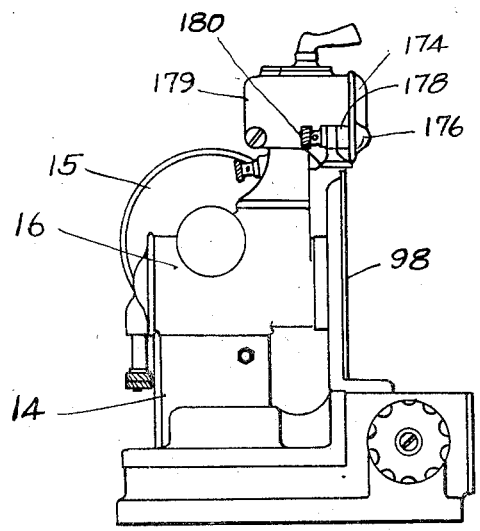
Fig. 2 is an end elevational view of the apparatus shown in Fig. 1, the view being taken from the control end of the machine.

Referring to the drawings, in which is disclosed a preferred embodiment of the invention, the numeral 10 indicates the base of the slicing machine which is illustrated as a casting, generally rectangular in shape. The base 10 carries a raised portion or upwardly extending rectangular projection 14 upon which is mounted a motor 15 and gear casing 16 for rotatably supporting and driving a rotary disk knife 30. Mounted on the base at the rear side of the knife is a slice receiving tray 140. Also mounted on the base at the side of the rotary knife is a gage plate 98 provided with suitable adjusting connections for regulating the thickness of the slices being cut. The slicing machine is also provided with a meat supporting carriage with suitable supporting and guide tracks therefor so that it may be moved back and forth across the front face of the knife during slicing operation. As such parts form no part of the invention claimed herein, they are omitted for clearness in illustration or shown merely in elevation. It is to be understood that any suitable construction of such parts can be provided, such as those shown in the divisional application referred to above.

The rotary knife is shown as of the usual circular disk type with a beveled cutting portion 32 on the rear face forming a peripheral cutting edge, and has a circular recess 33 in the front face thereof to receive the guard plate 34. The outer surface of the guard plate 34 preferably lies in a vertical plane slightly back of the vertical plane of the cutting edge of the knife. This guard is generally circular in shape as shown in Fig. 1, but is provided at the lower portion thereof with an outwardly extending flange 168 seating upon a bracket 169 which bridges across from, and is fastened to, the upper surface of the box 50' and the upstanding flange 100 by screws 172. The upper portion of the guard plate 34 is provided with an offset flange 173 which is fastened by screws 173' to a cooperating portion of a cover plate 174, which is in turn provided with outwardly extending lugs 175 and 176 which respectively cooperate with outwardly extending lugs 177 and 178 formed on a grinder casing 179 seating on top of the housing 16. Thumb screw 180 passes through openings in the lugs 177 and 178 and thread within a bore within the rear surfaces of the lugs 175 and 176 to removably fasten the cover 174 to grinder casing 179. The bracket 169 is provided with spaced openings 170 and 170' through which pass threaded dowel pins 171 and 171' respectively, the pins having hexagonal flanges or collers 182 made integral therewith, and are fastened in place by locking nuts 182' threaded on the dowel pins beneath the bracket, the side of the flange or collar 182 of each pin engaging a cooperating shoulder 169' on the upper surface of the bracket to prevent the dowel from turning as the nuts 182' are tightened to securely fasten the dowels in place. The upper ends of the dowel pins are tapered to receive spaced openings 167 and 167' formed through the flange 168 to properly position the guard plate 34 with reference to the front face of the knife 30. The guard plate 34 is thus rigidly fastened at spaced points at its upper end to a fixed part of the machine; and the dowels 171 and 171' may be adjusted with reference to the bracket 169 by loosening the lock nuts 182' to permit horizontal shifting of the pins within the openings 170 and 170' which are of substantially larger diameter than the exterior diameter of the pins. The arrangement is such that a rigid support is also provided at spaced points at the lower end of the guard plate, so that when the thumb screws 180 are tightened to clamp the cover 174 in position, the guard is rigidly and securely clamped in position and properly centered within the recess 33 of the front face of the knife 30 but out of contact with the knife; while ready removability of the guard plate is afforded merely by the removal of the thumb screws 180.

The edge of the knife opposite to that at which the slicing is performed is provided with an arcuate channel-shaped guard member 183 which is formed at its upper end with an outwardly extending lug 184 having an opening through which passes the thumb screw 181 to hold this end of the guard in fixed position, and is provided at its lower end with an outwardly extending lug 185 having an opening through which passes a thumb screw 186 threading within a bore formed in an upwardly extending lug 187 of the bracket 169. As a further protection, a pivoted finger 188 is formed with a bearing lug 189 having an opening receiving the thumb screw 180 so that this finger is mounted in position over the edge of the slicing knife in the space intermediate the grinder casing 179 and the edge of the gage plate 93.

Threaded into the under side of bracket 169 is a bolt 190 on which is pivotally mounted a bearing lug 191 formed integral with an outwardly extending arm 192 to which is fastened at its outer end a scraping blade 194, which is adapted to bear against the peripheral plane surface of the forward side of the knife to maintain the same properly cleaned. The scraper blade 194 is yieldingly urged into engagement with the knife edge by means of a coil spring 195, one end of which is fastened to the bracket 169 and the other end to the arm 192 to act resiliently against this pivoted arm.

Referring more particularly to Figs. 3 and 4, a grinder casing 179 is provided with a series of vertically extending interior ribs 260, 261 and 262 forming a guide for slidably receiving an interior grinder unit 263. The casing of the grinder unit has rearwardly extending slides 264 and 265 adapted to engage opposite surfaces of the vertical rib 261. The slides 264 and 265 are in turn provided with vertically extending grooves 266 and 267 respectively within which is positioned a rectangular bar 268 which is fastened to the rib 261 by screws 269. The arrangement is such that when the screws 269 are drawn tight the bar 268 forces the slides 264 and 265 rearwardly into engagement with the ribs 260 and 262 to thereby securely fasten the grinder unit 263 in adjusted position. When the screws 269 are loosened, the grinder unit is free to slide up and down the aligned tracks to thereby position the grinders in proper relation to the edge of the knife, and to permit proper adjustment to compensate for wear of the knife edge.

Adjustment of the vertical position of the grinder unit is obtained by means of a screw 270 which is threadedly received within a threaded bore 271 in the top of the grinder unit. This screw passes through the top of the grinder casing 179 and through an overlying cover member 272 having an upstanding centrally arranged boss 273 with an axial bore within which is rotatably mounted a control shaft 275 carrying at its outer end on the exterior of the casing a control handle 276. The handle is provided with a collar 277 pinned to shaft 275, the collar overlying boss 273 to support shaft 275. A collar 278 pinned to shaft 275 on the under side of the cover 272 serves to prevent play and axial movement of the shaft. Shaft 275 is interconnected on the interior of the grinder casing with a cam member 280 having a cutaway portion or flat 281 on one side thereof, the cam member being rotatably mounted in suitable bearings within the grinder unit 263. This interconnection is by means of a cross pin 282 carried by shaft 275, the opposite protruding ends of pin 282 being received within diametrically opposed elongated slots 282' formed in the upper end of cam 280.

The grinder unit 263 carries cylindrical sleeves 283 and 284 within which are slidably mounted bearing members 285 and 286 respectively. Rotatably mounted in ball bearing 287 in member 285 is a spindle 288 to which is fastened at its outer threaded end 289 a grinding disk 290 which is adapted to contact with the front peripheral surface of the knife to remove the burr therefrom. The grinding wheel 290 is urged by spring 291, bearing at one end against a cover 292 attached to sleeve 283 and at the other end against a shoulder 293 of bearing member 285, toward operative grinding position with wheel 290 resiliently pressed by spring 291 against the knife. Sleeve 283 is provided at one side thereof with a longitudinal slot 295 through which passes a pin 296 rigidly carried by bearing member 285. In the position shown in Fig. 4, the cam member 280 bears against pin 296 to hold the grinder 290 out of contact with the knife against the action of spring 291.

Bearing member 286 rotatably receives in suitable bearings a spindle 298 to which is fastened at its outer threaded end by nut 299 a grinding stone 300, the stone being pressed rigidly into place against a shoulder 300' on spindle 298. Bearing member 286 is urged by spring 301 positioned between the end of sleeve 284 and a shoulder 302 on the bearing member toward operative grinding position with wheel 300 resiliently pressed into contact with the rear beveled surface 32 of the rotary knife. In the position shown in Fig. 4, the grinding wheel 300 is also held out of operative engagement with the knife by means of the cam member 280 engaging an arm 303 protruding through slot 304 in the side wall of sleeve 284. By moving handle 276 clockwise or to the left as shown in Fig. 1 an angular distance of about 90°, cam member 280 will be rotated so as to bring the cutaway portion 281 opposite the arm 303, so that the spring 301 is then free to move the grinding wheel 300 into contact with the beveled edge of the knife to perform the grinding operation, wheel 300 and spindle 298 being rotated by contact with the knife driven by motor 15. By rotating handle 276 counterclockwise from this position to that shown in Figs. 1 and 4, the cam member 280 forces the arm 303 and bearing member 286 to inoperative position to remove stone 300 from contact with the knife; and then upon a further counterclockwise movement of the handle 276 about 90°, the flat 281 is brought opposite the arm 296 to permit the bearing sleeve and grinding wheel 290 to move into contact with the front side of the knife under the action of spring 291 to thereby remove the burr resulting from the grinding operation. The handle 276 is then moved back to neutral position, which is that shown in Figs. 1 and 4, and is the position in which the parts are normally maintained during actual slicing operation of the machine. The slots 282' are elongate to permit the desired range of vertical adjustment of the grinder unit 263 by screw 270, the shaft 275 and pin 282 sliding within the cam 280 and slots 282' during such vertical adjustment. This adjustment is accomplished by first loosening screws 269 to free the grinder unit from the slides or ribs 260 and 262, then turning screw 270 until the desired vertical positioning of the unit for proper cooperation of the grinding wheels with the knife is secured, and again tightening screws 269 to clamp the unit in adjusted position.

In order to permit the grinding wheel 300 to be brought into contact with the beveled edge 32 of the knife at various angular inclinations, the casing of the grinder unit 263 is split as shown at 306, so that the sleeve 284 carrying the bearing member 286 and grinding wheel 300 is free to move relative to the other parts of the grinder unit 263. The sleeve 284 is provided with a downwardly depending lug 307 through which passes a pivot pin 308 fastened to the other part of the casing of the grinder unit 263. The sleeve 284 is also provided with a lug 309 within which is an arcuate slot 310 which receives a locking screw 311 threaded within the other part of the casing of the grinder unit 263. By loosening the screw 311, the sleeve 284 may be rocked about the pivot 308, the arcuate slot 310 moving past the screw. The screw 311 is then tightened to clamp the sleeve 284 and parts carried thereby in adjusted position, with the grinding stone 300 at the desired inclination. The other part of casing of the grinder unit 263 is provided with a longitudinal slot 313 opposite slot 304 in sleeve 284 through which the pin 303 extends, the slot 313 having sufficient width to accommodate the desired range of pivotal movement of the sleeve 284 about the pivot pin 308.

The grinder casing 179 is provided with a bore 315 through which passes a pivot pin 316 mounted in lugs 317 extending from a lower stationary member 318 which is fixedly mounted upon the housing 16 and supports the grinder casing 179 therefrom. In order to retain the casing 179 in its normal position shown in Fig. 3, a thumb screw 319 with a shaft 320 is threadedly received at its outer end within a bore 322 in a lower portion of the grinder casing 179. The shaft 320 is provided with a portion 323 of reduced diameter immediately behind the threaded portion 321, this portion 323 passing through a threaded bore 324 in the stationary member 318. The arrangement is such that when the thumb screw is turned to remove the threaded end 321 from the bore 322 of the grinder casing 179, the screw will not be permitted to fall out of its socket in the member 318, but the threads 321 will then engage within the threads 324. When the screw 319 is thus loosened, and when the cover plate 174 is removed by removal of the thumb screws 180 and 181, the grinder casing 179 is then free to be tilted about the pivot pin 316 to a position away from the knife 30 so as to facilitate cleaning of the then exposed grinder parts.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In a slicing machine having a rotary knife, a grinder casing mounted adjacent the edge of said knife in a normally fixed position and forming a guard for a portion of the edge of the knife, a normally fixed guard for another portion of the knife edge mounted on said grinder casing, a grinder unit mounted within said grinder casing having a grinder for the rear side of said knife and a grinder for the front side of said knife, said grinder casing enclosing said grinder unit, and means carried by said grinder casing for adjusting said grinder unit relative to said grinder casing in the plane of said knife to permit adjustment of the position of said grinders within said casing to compensate for wear of the knife edge, while maintaining said grinder casing in said normally fixed position.

2. In a slicing machine, a base, a casing mounted on said base, a rotary knife supported on said casing, a grinder casing mounted on said casing adjacent the upper edge of said knife in a normally fixed position and providing a normally fixed guard for a portion of the edge of the knife, a grinder within said grinder casing, a cam member for controlling the position of said grinder relative to said knife, a shaft for operating said cam member carried by said grinder casing, a control handle carried by said shaft on the exterior of said casing, a pin and slot interconnection between said operating shaft and said cam member, and means for adjusting the position of said grinder and cam member relative to said grinder casing and knife, the pin of said pin and slot interconnection moving along said slot to provide for the said adjusting movement of said cam member relative to said operating shaft carried by the grinder casing.

3. In a slicing machine having a rotary knife, a grinder casing mounted adjacent the edge of said knife, a grinder for the front side of said knife mounted therein, a grinder for the rear side of said knife mounted therein, a control member for said grinders, a cam shaft actuated by said control member extending generally perpendicular to the longitudinal axes of said grinders and positioned intermediate said grinders, a single cam on said cam shaft, and arms extending outwardly from said grinders toward each other, and on opposite sides of said single cam for cooperation with the said same cam, said cam having a single slot on one side thereof for cooperation with both of said arms.

4. In a slicing machine, a base, a motor and gear casing mounted on said base, a rotary knife carried by said casing, a grinder casing supported on said casing adjacent the upper edge of said knife and overhanging the upper edge thereof, a removable front cover for said grinder casing, and a guard for the front face of said knife carried by said cover.

5. In a slicing machine, a base, a motor and gear casing mounted on said base, a rotary knife carried by said gear casing, a grinder casing supported on said casing adjacent the upper edge of said knife, a removable front cover for said grinder casing, means for removably fastening said front cover in place on said grinder casing, an arcuate guard for the rear edge of said knife, the upper end of said guard being removably mounted on said means for mounting the front cover in place.

6. In a slicing machine, a base, a motor and gear casing mounted on said base, a rotary knife carried by said casing, a grinder casing supported on said casing adjacent the upper edge of said knife and overhanging the said edge, a removable cover for said grinder casing, a bracket mounted on said base opposite the front face of said knife, and a guard for the front face of said knife supported at its lower end on said bracket and fastened at its upper end to said front cover for the grinder casing.

7. In a slicing machine, a base, a motor and gear casing mounted on said base, a rotary knife carried by said casing, a grinder casing supported on said casing adjacent the upper edge of said knife and overhanging the said edge, a removable cover for said grinder casing, a bracket mounted on said base opposite the front face of said knife, said bracket having an upwardly projecting pin, and a guard for the front face of said knife, said guard having an outwardly extending flange with an opening therein removably receiving said pin and supported on said bracket, and means for fastening the upper end of said guard to said front cover of the grinder casing.

8. In a slicing machine, a base, a casing mounted on said base, a rotary knife supported in said casing, a grinder casing mounted on said casing over the upper edge of said knife, a removable cover for said grinder casing overlapping said knife edge, said cover being also attached to a portion of the machine, and a pivotal mounting for said grinder casing at the rear side thereof remote from the knife to permit said casing to be tilted back away from the knife edge when said cover is removed, and means for locking said casing in operative position adjacent the knife edge.

9. In a slicing machine, a base, a casing mounted thereon, a rotary knife supported in said casing, a grinder pedestal mounted on said casing, lugs carried by said grinder pedestal having aligned openings therein, a pin mounted in said aligned openings, a grinder casing tiltably mounted on said pin in position to guard the upper edge of said knife, a plurality of grinder sleeves mounted within said casing, a grinder for the front side of said knife and a grinder for the rear side of said knife mounted in said sleeves, a locking screw carried by said grinder pedestal and threaded into said casing to hold it in operative position adjacent the knife edge, and means carried by said pedestal to retain said locking screw in position when removed from said casing to permit said casing with grinders carried thereby to be tilted back about said pivot pin away from the knife edge.

10. In a slicing machine having a rotary knife, a grinder casing mounted in normally fixed position adjacent the edge of said knife and providing a guard for the edge of the knife, a grinder unit supported within and by said casing and having a grinder for the rear side of said knife and a grinder for the front side of said knife, cooperating guide means and slide means carried by said grinder casing and grinder unit for slidably supporting said grinder unit within and relative to said grinder casing, means for adjusting said grinder unit relative to said casing, and means for locking said grinder unit in adjusted position within said grinder casing.

11. In a slicing machine having a rotary knife, a grinder casing mounted in normally fixed position adjacent the edge of said knife and providing a guard for the edge of the knife, a grinder unit therein having a grinder for the edge of said knife, a cam for controlling the position of said grinder relative to said knife edge, a shaft for operating said cam, a control handle on the exterior of said casing for actuating said shaft, adjusting means for adjusting said grinder unit relative to said grinder casing in the plane of said knife while maintaining the normally fixed position of said grinder casing, said cam having an elongate slot therein, and a pin carried by said operating shaft and positioned within said slot to rotate said cam member upon rotation of said handle member and shaft, said elongate slot permitting movement of said grinder unit and cam relative to said shaft and pin upon adjustment of said grinder unit in the plane of the knife.

12. In a slicing machine having a rotary knife, a grinder casing mounted adjacent the edge of said knife, a grinder unit mounted within said grinder casing and having a grinder for the front side of said knife and a grinder for the rear side of said knife, spring means for urging each of said grinders toward said knife, a cam rotatably mounted in said grinder unit intermediate said grinders, arms extending outwardly from each of said grinders on opposite sides of said cam, the longitudinal axis of said cam extending generally perpendicular to the longitudinal axes of said grinders, said cam having a slot on one side thereof for cooperation with both of said arms to permit the spring means to move its respective grinder into contact with the knife when said slot is brought opposite the respective arm of that grinder, a control shaft rotatably mounted in said grinder casing, a pin and slot interconnection between said control shaft and said cam, means for adjusting said grinder unit relative to said casing in the plane of said knife, said slot of said pin and slot interconnection being elongate to permit said cam to move axially of said control shaft upon said adjusting movement.

13. In a slicing machine, a base, a casing mounted on said base, a rotary knife supported by said casing, a grinder casing mounted on said casing adjacent in normally fixed position the edge of said knife and providing a guard for the edge of the knife, a grinder unit supported within said grinder casing including a grinder for the front side of the knife and a grinder for the rear side of the knife, cooperating guide and slide members for slidably supporting said grinder unit within said grinder casing, means for adjusting said grinder unit along said slidable support of the grinder casing to compensate for wear of the knife edge while maintaining the normally fixed position of said grinder casing, cam means carried by the grinder unit for controlling the engagement and disengagement of said grinders with said knife, a control shaft for said cam carried by said grinder casing, and means for rotatably connecting said control shaft with said cam while providing for relative sliding movement of the cam with respect to the shaft upon slidable adjusting movement of said grinder unit.

14. In a slicing machine, a base, a rotary knife supported by said base, a grinder casing supported by said base in normally fixed position over the upper edge of said knife and positioned substantially symmetrical with respect to the central vertical diameter of said knife, said casing forming a guard for the upper portion of the knife edge on both sides of said vertical diameter of the knife, a grinder for the edge of said knife mounted within said grinder casing, a guard for the front face of said knife, and means for mounting said guard on said grinder casing concentrically with respect to said knife face.

15. In a slicing machine, a base, a rotary knife supported by said base, a grinder casing supported by said base in normally fixed position over the upper edge of said knife and positioned substantially symmetrical with respect to the central vertical diameter of said knife, said casing forming a guard for the upper portion of the knife edge on both sides of said vertical diameter of the knife, a grinder for the edge of said knife mounted within said grinder casing, a guard for the front face of said knife, means for mounting said guard on said grinder casing concentrically with respect to said knife face, and an arcuate guard for the rear edge of said knife detachably connected at its upper end to the grinder casing and at its lower end to a part supported upon the base of the machine, the said gear casing, arcuate guard, and front face guard serving to effectively cover and shield the inoperative parts of the rotary knife.

HERBERT L. JOHNSTON.